United States Patent
Kharvar et al.

(10) Patent No.: US 11,005,674 B2
(45) Date of Patent: May 11, 2021

(54) PARENTAL CONTROL FOR BLUETOOTH MESH DEVICES

(71) Applicant: QUALCOMM Incorporated, San Diego, CA (US)

(72) Inventors: Chirag Manojkumar Kharvar, Bangalore (IN); Jagdeep Kumar Hans, Bangalore (IN); Sourabh Jana, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 16/173,119

(22) Filed: Oct. 29, 2018

(65) Prior Publication Data

US 2020/0136851 A1    Apr. 30, 2020

(51) Int. Cl.
| | |
|---|---|
| *H04W 4/80* | (2018.01) |
| *H04L 12/28* | (2006.01) |
| *H04L 29/08* | (2006.01) |
| *H04W 88/02* | (2009.01) |
| *H04W 84/18* | (2009.01) |

(52) U.S. Cl.
CPC ........ *H04L 12/2816* (2013.01); *H04L 67/125* (2013.01); *H04W 4/80* (2018.02); *H04W 88/023* (2013.01); *H04W 84/18* (2013.01)

(58) Field of Classification Search
CPC ....................................................... H04W 4/80
USPC ............................................................ 726/27
See application file for complete search history.

(56) References Cited

U.S. PATENT DOCUMENTS

| | | | | |
|---|---|---|---|---|
| 2011/0065419 A1* | 3/2011 | Book | .................... | H04W 12/12 455/411 |
| 2012/0246294 A1* | 9/2012 | Eaton | .................... | H04W 48/20 709/224 |
| 2014/0197927 A1* | 7/2014 | Kwon | .................... | H04W 48/02 340/10.1 |
| 2016/0381549 A1* | 12/2016 | Lam | ........................ | H04W 4/06 455/414.1 |
| 2017/0083715 A1* | 3/2017 | Gupta | .................. | G06F 11/3003 |
| 2018/0262533 A1* | 9/2018 | McCaig | .............. | H04L 63/0209 |

* cited by examiner

*Primary Examiner* — Jacob Lipman
(74) *Attorney, Agent, or Firm* — Holland & Hart LLP/Qualcomm

(57) ABSTRACT

Methods, systems, and devices for controlling mesh network devices are described. The method includes receiving, by an automation device, a first message from a control device, adding, by the automation device, the identifier of the first user device to a priority list of the automation device based on receiving the first message, and controlling, by the automation device, access to operations of the automation device based on the identifier in the priority list after adding the identifier of the first user device. In some cases, the first message includes an identifier of a first user device and an add command.

16 Claims, 9 Drawing Sheets

PARENTAL CONTROL FOR BLUETOOTH MESH DEVICES

BACKGROUND

The following relates generally to wireless communications, and more specifically to controlling access to certain devices (e.g., wireless mesh devices, etc.).

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

In some cases, a first wireless communications device may establish a connection with a second wireless communications device. In some examples, the second wireless communications device may initiate a function associated with the first wireless communications device. Improved techniques for wireless communications are desired.

SUMMARY

The described techniques relate to improved methods, systems, devices, and apparatuses that support control (e.g., parental or oversight control) for wireless mesh devices (e.g., Bluetooth devices in a wireless mesh network). Generally, the described techniques provide for controlling one or more mesh network devices. Specifically, the described techniques may include controlling access to operations of a particular device of a wireless mesh network. For example, the described techniques may include controlling when, how, and/or whether a user device may access one or more operations of a second device (e.g., an automation device) in a wireless mesh network.

In some cases, a first wireless communications device may establish a connection with a second wireless communications device. In some examples, the second wireless communications device may initiate a function associated with the first wireless communications device. In some cases, the second wireless communications device may be configured to control a function associated with the first wireless communications device even when an administrator of the first wireless communications device does not want the second wireless communications device to be able to do so. Improved techniques for wireless communications are desired.

A method of controlling mesh network devices is described. The method may include receiving, by an automation device, a first message from a control device, the first message including an identifier of a first user device and an add command, adding, by the automation device, the identifier of the first user device to a priority list of the automation device based on receiving the first message, and controlling, by the automation device, access to operations of the automation device based on the identifier in the priority list after adding the identifier of the first user device.

An apparatus for controlling mesh network devices is described. The apparatus may include a processor, memory in electronic communication with the processor, and instructions stored in the memory. The instructions may be executable by the processor to cause the apparatus to receive, by an automation device, a first message from a control device, the first message including an identifier of a first user device and an add command, add, by the automation device, the identifier of the first user device to a priority list of the automation device based on receiving the first message, and control, by the automation device, access to operations of the automation device based on the identifier in the priority list after adding the identifier of the first user device.

Another apparatus for controlling mesh network devices is described. The apparatus may include means for receiving, by an automation device, a first message from a control device, the first message including an identifier of a first user device and an add command, adding, by the automation device, the identifier of the first user device to a priority list of the automation device based on receiving the first message, and controlling, by the automation device, access to operations of the automation device based on the identifier in the priority list after adding the identifier of the first user device.

A non-transitory computer-readable medium storing code for controlling mesh network devices is described. The code may include instructions executable by a processor to receive, by an automation device, a first message from a control device, the first message including an identifier of a first user device and an add command, add, by the automation device, the identifier of the first user device to a priority list of the automation device based on receiving the first message, and control, by the automation device, access to operations of the automation device based on the identifier in the priority list after adding the identifier of the first user device.

Some examples of the method, apparatuses, and non-transitory computer-readable medium described herein may further include operations, features, means, or instructions for sending, to the control device, a reply message indicating whether the first user device may have been added to the priority list, where controlling access to operations of the automation device may be based on sending the reply message.

Some examples of the method, apparatuses, and non-transitory computer-readable medium described herein may further include operations, features, means, or instructions for receiving, from the first user device, a second message including an identifier of a second user device and a block command to add the identifier of the second user device to a block list of the automation device, where controlling access to operations of the automation device may be based on receiving the second message.

Some examples of the method, apparatuses, and non-transitory computer-readable medium described herein may further include operations, features, means, or instructions for sending, to the first user device, a third message indicating whether the identifier of the second user device may have been added to the block list, where controlling access to operations of the automation device may be based on sending the third message.

Some examples of the method, apparatuses, and non-transitory computer-readable medium described herein may further include operations, features, means, or instructions for removing the identifier of the second user device from the block list upon determining a time period lapses, where the second message indicates the time period.

Some examples of the method, apparatuses, and non-transitory computer-readable medium described herein may further include operations, features, means, or instructions for receiving, from the second user device, a fourth message including a command for the automation device to perform an operation, querying the block list based on receiving the fourth message and ignoring the command of the fourth message based on a result of the querying.

Some examples of the method, apparatuses, and non-transitory computer-readable medium described herein may further include operations, features, means, or instructions for receiving, from the first user device, a fifth message including a removal command to remove the identifier of the second user device from the block list, where controlling access to operations of the automation device may be based on the removal command.

Some examples of the method, apparatuses, and non-transitory computer-readable medium described herein may further include operations, features, means, or instructions for sending, to the control device before receiving the first message, a request to provision the automation device in a wireless mesh network of the control device and receiving, from the control device, an indication confirming that the automation device may be provisioned in the wireless mesh network.

Some examples of the method, apparatuses, and non-transitory computer-readable medium described herein may further include operations, features, means, or instructions for adding an identifier of the control device to a priority list of the automation device based on receiving the indication.

Some examples of the method, apparatuses, and non-transitory computer-readable medium described herein may further include operations, features, means, or instructions for ignoring a request to remove the identifier of the control device from the priority list while the automation device may be provisioned in the wireless mesh network of the control device.

DETAILED DESCRIPTION

Figure 1:
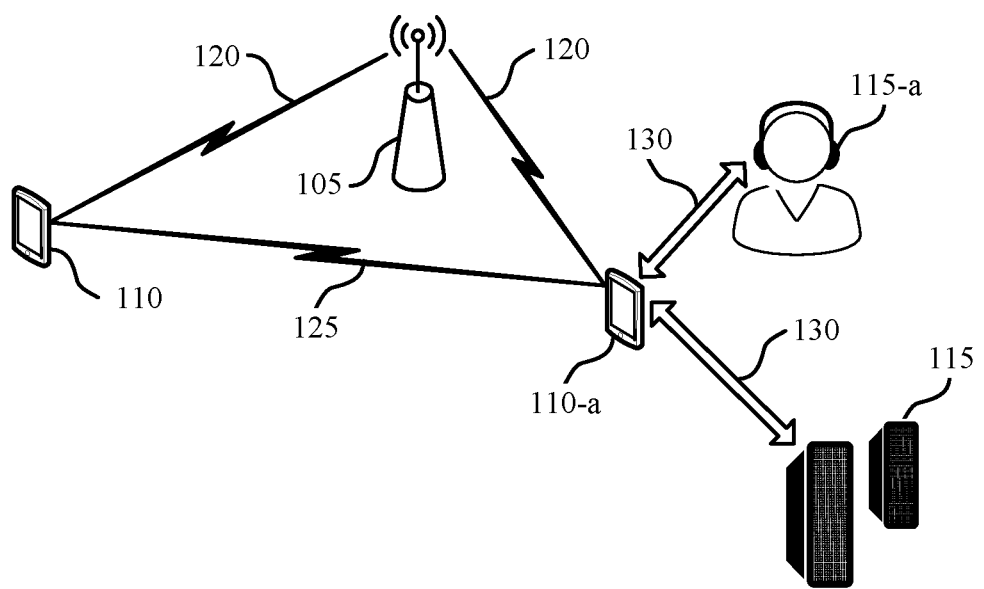
FIG. 1 illustrates an example of a wireless communications system for controlling mesh network devices that supports parental control for wireless mesh devices in accordance with aspects of the present disclosure.

In some cases, wireless mesh networks may be used in various environments, such as for home automation. In some examples, different mesh capable devices and appliances may be connected in a wireless mesh network and may be operated by one or more users. Example devices and appliances may include, but are not limited to, automation control panels, automated light switches, automated door locks, motion sensors, security cameras, smart televisions, water heaters, refrigerators, ovens, stoves, microwaves, fans, heating ventilation air conditioning (HVAC), etc. In some cases, users of wireless mesh networks may be of any range of ages from children to adults and the users may have varying degrees of permission or opportunity to interact with various devices in the environment. Existing wireless mesh networks, however, do not provide for parental control or other oversight, which may allow a child (or other user) to control functions and/or alter configurations of devices in the wireless mesh network incorrectly or at odds with the administrator's desire, which may result in damage to devices in the wireless mesh network and/or other problems.

The disclosed techniques provide a Parental Control Model (PCM) to control access to functions of devices in wireless mesh networks. The disclosed techniques may enable one or more devices (e.g., parent devices which may be smartphones in some cases) to be configured to control one or more aspects of devices in a wireless mesh network, while blocking one or more other devices (e.g., child or guest devices) from controlling one or more devices (e.g., automation devices) in the wireless mesh network. In one example, the disclosed techniques may determine whether a user device supports the PCM model. After determining the user device supports the PCM model, a provisioner (e.g., provisioning device of the wireless mesh network) may enable the user device to control one or more automation devices in the wireless mesh network of the provisioner.

The present techniques provide a solution to multiple problems that exist with conventional systems. For example, in a home setting, devices of parents and children may control different appliances in the home with a system. Thus, in other systems a child with a connected device may control aspects of automated devices in the home such as turning automated lights on/off, adjusting a water heater, controlling a television, etc. Allowing a child to control the automated devices like water heaters, heating ventilating air conditioning (HVAC) systems, refrigerators may be dangerous. For example, turning an appliance on/off continuously may result in long-term damage to the appliance and/or other devices associated with the appliance. The present techniques remedy such problems by enabling a parent or an administrator to prevent a "child" (e.g., a child or a non-administrator) from controlling certain devices/appliances.

In another example, a premises may include an automated gate connected to a wireless mesh network (e.g., Bluetooth mesh network), where the gate is locked based on a first timer (e.g., automatically locked at 11:00 PM) and unlocked based on a second timer (e.g., automatically unlocked at 6:00 AM). The present techniques may enable a privileged device (e.g., a device added to a priority list) that is connected to the wireless mesh network to unlock the gate when the gate is locked, while an unprivileged device (e.g., a device not added to the priority list) or a blocked device (e.g., a device added to a block list) is not allowed to unlock the gate when the gate is locked.

In another example, a home or office may include an automated lock connected to a wireless mesh network (e.g., Bluetooth mesh network). The present techniques enable an occupant to use a device of the occupant to control the automated lock at any time. The present techniques may also enable the occupant to allow a device of a temporary guest of the home or office to control the automated lock for a predetermined time period or up to a scheduled expiration of the access.

Aspects of the disclosure are initially described in the context of a wireless communications system. In some examples, the wireless communications system may include mesh network devices and the described techniques may include controlling access to one or more of the mesh network devices of the wireless communications system. Aspects of the disclosure are further illustrated by and described with reference to apparatus diagrams, system diagrams, and flowcharts that relate to parental control for wireless mesh devices (e.g., Bluetooth mesh devices in a wireless mesh network).

FIG. 1 illustrates a wireless communications system 100 (e.g., which may include to refer to or include a wireless personal area network (PAN), a wireless local area network (WLAN), a Wi-Fi network) configured in accordance with various aspects of the present disclosure. The wireless communications system 100 may include an AP 105, devices 110, and paired devices 115 implementing WLAN communications (e.g., Wi-Fi communications) and/or Bluetooth communications. For example, devices 110 may include cell phones, mobile stations, personal digital assistant (PDAs), other handheld devices, netbooks, notebook computers, tablet computers, laptops, or some other suitable terminology. Paired devices 115 may include Bluetooth devices capable of pairing with other Bluetooth devices (e.g., such as devices 110), which may include wireless headsets, speakers, ear pieces, headphones, display devices (e.g., TVs, computer monitors), microphones, meters, valves, etc.

Bluetooth communications may refer to a short-range communication protocol and may be used to connect and exchange information between devices 110 and paired devices 115 (e.g., between mobile phones, computers, digital cameras, wireless headsets, speakers, keyboards, mice or other input peripherals, and similar devices). Bluetooth systems (e.g., aspects of wireless communications system 100) may be organized using a master-slave relationship employing a time division duplex protocol having, for example, defined time slots of 625 mu secs, in which transmission alternates between the master device (e.g., a device 110) and one or more slave devices (e.g., paired devices 115). In some cases, a device 110 may generally refer to a master device, and a paired device 115 may refer to a slave device in a PAN. As such, in some cases, a device may be referred to as either a device 110 or a paired device 115 based on the Bluetooth role configuration of the device. That is, designation of a device as either a device 110 or a paired device 115 may not necessarily indicate a distinction in device capability, but rather may refer to or indicate roles held by the device in the PAN. Generally, device 110 may refer to a wireless communication device capable of wirelessly exchanging data signals with another device, and paired device 115 may refer to a device operating in a slave role, or to a short-range wireless device capable of exchanging data signals with the mobile device (e.g., using Bluetooth communication protocols).

A Bluetooth device may be compatible with certain Bluetooth profiles to use desired services. A Bluetooth profile may refer to a specification regarding an aspect of Bluetooth-based wireless communications between devices. That is, a profile specification may refer to a set of instructions for using the Bluetooth protocol stack in a certain way, and may include information such as suggested user interface formats, particular options and parameters at each layer of the Bluetooth protocol stack, etc. For example, a Bluetooth specification may include various profiles that define the behavior associated with each communication endpoint to implement a specific use case. Profiles may thus generally be defined according to a protocol stack that promotes and allows interoperability between endpoint devices from different manufacturers through enabling applications to discover and use services that other nearby Bluetooth devices may be offering. The Bluetooth specification defines device role pairs that together form a single use case called a profile. One example profile defined in the Bluetooth specification is the Handsfree Profile (HFP) for voice telephony, in which one device implements an Audio Gateway (AG) role and the other device implements a Handsfree (HF) device role. Another example is the Advanced Audio Distribution Profile (A2DP) for high-quality audio streaming, in which one device (e.g., device 110-a) implements an audio source device (SRC) role and another device (e.g., paired device 115-a) implements an audio sink device (SNK) role.

For a commercial Bluetooth device that implements one role in a profile to function properly, another device that implements the corresponding role must be present within the radio range of the first device. For example, in order for an HF device such as a Bluetooth headset to function according to the Handsfree Profile, a device implementing the AG role (e.g., a cell phone) must be present within radio range. Likewise, in order to stream high-quality mono or stereo audio according to the A2DP, a device implementing the SNK role (e.g., Bluetooth headphones or Bluetooth speakers) must be within radio range of a device implementing the SRC role (e.g., a stereo music player).

The Bluetooth specification defines a layered data transport architecture and various protocols and procedures to handle data communicated between two devices that implement a particular profile use case. For example, various logical links are available to support different application data transport requirements, with each logical link associated with a logical transport having certain characteristics (e.g., flow control, acknowledgement/repeat mechanisms, sequence numbering, scheduling behavior). The Bluetooth protocol stack is split in two parts: a "controller stack" containing the timing critical radio interface, and a "host stack" dealing with high level data. The controller stack is generally implemented in a low cost silicon device containing the Bluetooth radio and a microprocessor. The controller stack may be responsible for setting up links 130 such as asynchronous connection-less (ACL) links, synchronous connection orientated (SCO) links, etc. Further, the controller stack may implement link management protocol (LMP) functions, low energy link layer (LE LL) functions, etc. The host stack is generally implemented as part of an operating system, or as an installable package on top of an operating system. The host stack may be responsible for logical link control and adaptation protocol (L2CAP) functions, Bluetooth network encapsulation protocol (BNEP) functions, service discovery protocol (SDP) functions, etc. In some cases, the controller stack and the host stack may communicate via a host controller interface (HCI). In other cases, (e.g., for integrated devices such as Bluetooth headsets), the host stack and controller stack may be run on the same microprocessor to reduce mass production costs. For such "hostless systems," the HCI may be optional, and may be implemented as an internal software interface.

A link 130 established between two Bluetooth devices (e.g., between a device 110-a and a paired device 115-a) may provide for communications or services (e.g., according to some Bluetooth profile). For example, a Bluetooth connection may be an extended synchronous connection orientated (eSCO) link for voice call (e.g., which may allow for retransmission), an ACL link for music streaming (e.g., A2DP), etc. For example, eSCO packets may be transmitted in predetermined time slots (e.g., 6 Bluetooth slots each for eSCO). The regular interval between the eSCO packets may be specified when the Bluetooth link is established. The eSCO packets to/from a specific slave device (e.g., paired device 115-a) are acknowledged, and may be retransmitted if not acknowledged during a retransmission window. In addition, audio may be streamed between the device 110-a and paired device 115-a using an ACL link (A2DP profile). In some cases, the ACL link may occupy 1, 3, or 5 Bluetooth slots for data or voice. Other Bluetooth profiles supported by Bluetooth devices may include Bluetooth Low Energy (BLE) (e.g., providing considerably reduced power consumption and cost while maintaining a similar communication range), human interface device profile (HID) (e.g., providing low latency links with low power requirements), etc.

In some cases, a device may be capable of both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some cases, Bluetooth and WLAN communications may share a same medium, such as the same unlicensed frequency medium. In such cases, a device 110 may support WLAN communications via AP 105 (e.g., over communication links 120). The AP 105 and the associated devices 110 may represent a basic service set (BSS) or an extended service set (ESS). The various devices 110 in the network may be able to communicate with one another through the AP 105. In some cases the AP 105 may be associated with a coverage area, which may represent a basic service area (BSA).

Devices 110 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within wireless communications system 100. AP 105 may be coupled to a network, such as the Internet, and may enable a device 110 to communicate via the network (or communicate with other devices 110 coupled to the AP 105). A device 110 may communicate with a network device bi-directionally. For example, in a WLAN, a device 110 may communicate with an associated AP 105 via downlink (e.g., the communication link from the AP 105 to the device 110) and uplink (e.g., the communication link from the device 110 to the AP 105).

In some examples, content, media, audio, etc. exchanged between a device 110 and a paired device 115 may originate from a WLAN. For example, in some cases, device 110-a may receive audio from an AP 105 (e.g., via WLAN communications), and the device 110-a may then implement the described techniques to relay or pass the audio to the paired device 115-a (e.g., via Bluetooth communications). In some cases, certain types of Bluetooth communications (e.g., such as high quality or high definition (HD) Bluetooth) may require enhanced quality of service. For example, in some cases, delay-sensitive Bluetooth traffic may have higher priority than WLAN traffic.

In one example, one or more of the APs 105, devices 110, and/or paired devices 115 may include an access control manager, which may control access to other devices in wireless communications system 100. For example, device 110-a may include an access control manager that controls how and/or whether device 110 and/or paired device 115 may access an operation associated with device 110-a. In some cases, the wireless communications system 100 may implement a parental control model (PCM) to control access to functions of devices in wireless mesh networks of wireless communications system 100. In some cases, device 110-a (e.g., a computing device of a parent) may be configured to control one or more aspects of devices in a wireless mesh network, while blocking one or more other devices (e.g., a computing device of a child) from controlling one or more devices in the wireless mesh network. In one example, a provisioning device (e.g., AP 105) may determine whether a user device (e.g., device 110-a) supports the PCM model. After determining the user device supports the PCM model, the provisioning device may enable the user device to control how one or more automation devices access the wireless mesh network of the provisioner.

Figure 2:
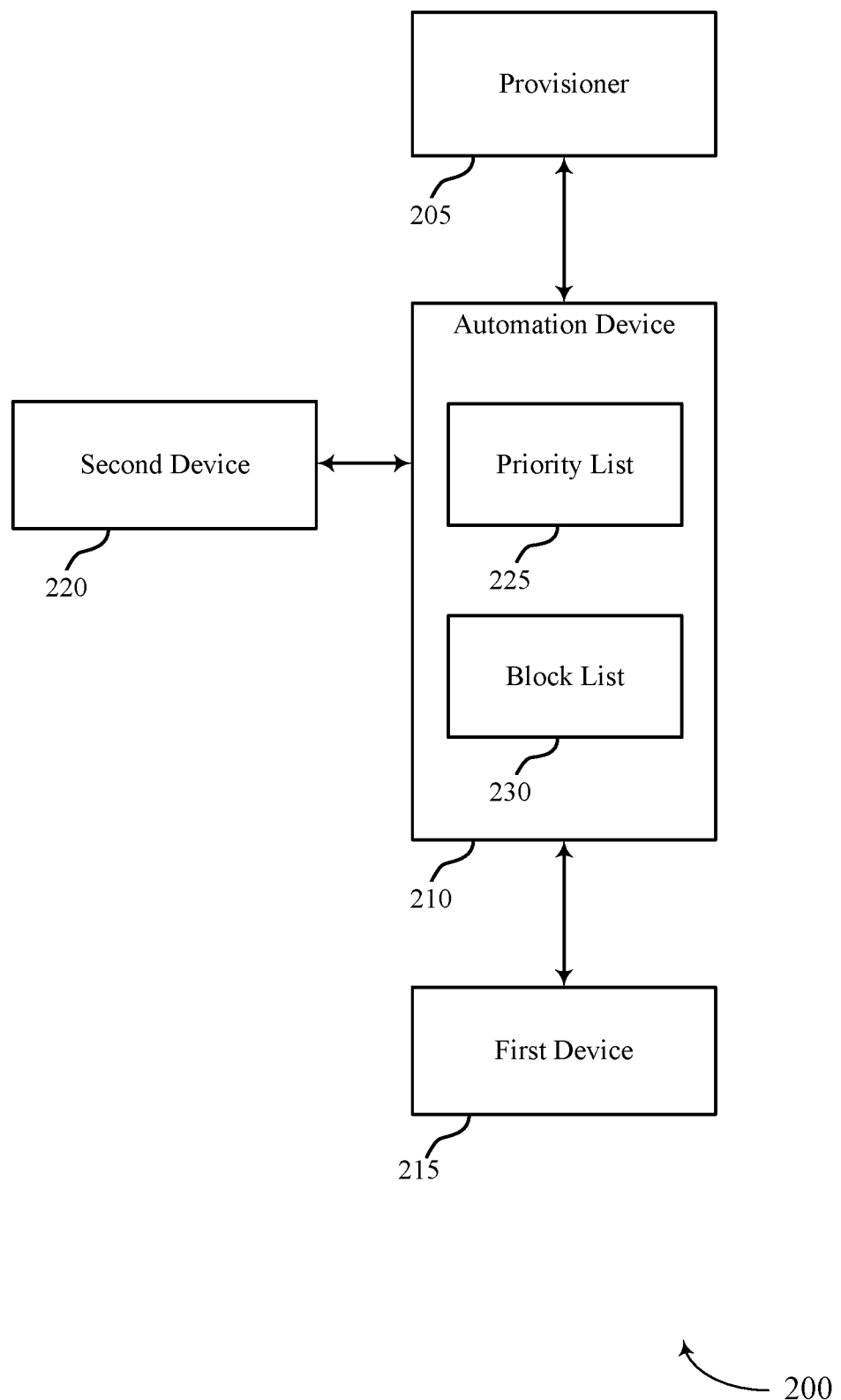
FIG. 2 illustrates another example of a wireless communications system that supports parental control for wireless mesh devices in accordance with aspects of the present disclosure.

FIG. 2 illustrates an example of a wireless communications system 200 that supports parental control for wireless mesh devices in accordance with aspects of the present disclosure. In some examples, wireless communications system 200 may implement aspects of wireless communications system 100.

In one example, wireless communications system 200 may include provisioner 205, automation device 210, first device 215, and second device 220. Examples of provisioner 205, automation device 210, first device 215, and second device 220 may include at least one of a computing device (e.g., desktop, laptop), a mobile computing device (e.g., smart phone, tablet), control panel, sensor device (e.g., motion sensor, light sensor, audio sensor, camera sensor, door sensor, window sensor), sensor server, device server, automated device (e.g., automated light switch, automated door lock, automated thermostat, automated fans, smart televisions), automated and/or networked home appliance (e.g., oven, stove, microwave, refrigerator, furnace, air conditioner, heating ventilating air conditioning (HVAC) systems), a data networking device, or any combination thereof.

In some examples, automation device 210 may be connected in a wireless mesh network (e.g., Bluetooth mesh network). In some cases, one or more functions and/or operations of automation device 210 may be configured to be controlled by one or more devices (e.g., first device 215 and/or second device 220).

The present disclosure relates to provisioning device 205 implementing a Parental Control Model (PCM) that is configured to control access to devices in a wireless mesh network of provisioning device 205. Provisioning device 205 may add automation device 210 to the wireless mesh network and determine whether a user device (e.g., first device 215 and/or second device 220) support the PCM model (e.g., first device 215 and/or second device 220 may show support for the PCM model based on composition data). Provisioning device 205 may analyze composition data from first device 215 and/or second device 220 to determine that at least one of devices supports the PCM model. For example, upon determining first device 215 supports the PCM model, provisioning device 205 may enable first device 215 to control how and when a device may access and/or interact with automation device 210.

In some examples, such as the example illustrated, automation device 210 may include at least one of priority list 225 and at least one block list 230. In some cases, priority list 225 may include a list of one or more devices allowed to control at least one aspect of automation device 210. For example, automation device 210 may include a preconfigured operation to control a first device such as a light switch (e.g., turn the light switch on/off, dim light switch), and those devices listed in priority list 225 may be permitted to request automation device 210 perform an operation to turn the light switch on/off, etc. In some cases, when automation device 210 determines that priority list 225 includes an identifier of a device (e.g., a source address of a device such as first device 215 and/or second device 220), automation device 210 may execute a request from the device to perform any of the operations of automation device 210. In some cases, after receiving the request automation device 210 may query a device having the priority list 225 before querying a device having the block list 230. Alternatively, after receiving the request automation device 210 may query a device having the block list 230 before querying a device having the priority list 225.

In some cases, block list 230 may include a list of one or more devices that are blocked from controlling at least one aspect of automation device 210. For example, automation device 210 may ignore a request from a device listed in block list 230. In some cases, when automation device 210 determines block list 230 includes an identifier of a device, automation device 210 may ignore any request that includes or indicates an identifier (e.g., an identifier from that device).

In some cases, a device may be listed in both priority list 225 and block list 230. For example, the device may be listed in priority list 225 with an indication that the device is permitted to control a first operation of automation device 210, and also be listed in block list 230 with an indication that the device is blocked from controlling a second operation of automation device 210 or a second operation for one or more other automation devices 210. In this example, when the device requests automation device 210 perform the first operation, automation device 210 may query a device having the priority list 225 to determine whether the device is permitted to control the first operation. In some cases, when automation device 210 determines that priority list 225 indicates the device is permitted to control the first operation, automation device 210 may execute the request. In some cases, automation device 210 may execute the request after determining priority list 225 indicates the device is permitted to control the first operation and block list 230 does not indicate the device is blocked from controlling the first operation. In some cases, one of priority list 225 and block list 230 may be given priority over the other such that is one device is found on both lists, the one device may blocked from controlling one or more operations when the blocked list 230 is given priority or the one device may permitted to control one or more operations when the priority list 225 is given priority.

In some cases, when the device requests automation device 210 perform the second operation, automation device 210 may query priority list 225 to determine whether the device is permitted to control the second operation. In one example, when automation device 210 determines priority list 225 does not indicate whether the device is permitted to control the second operation, automation device 210 may ignore the request. In some cases, after receiving the request automation device 210 may query the block list 230 to determine whether an identifier of the device is listed in block list 230 indicating the device is blocked from controlling the second operation. When automation device 210 determines that the block list 230 indicates the device is blocked from controlling the second operation, automation device 210 may ignore the request.

The present techniques (e.g., Parent Control Model) include several improvements, benefits, and advantages over other systems. For example, the present techniques enable automation device 210 to control access to the operations/functions of automation device 210 without intervention of or assistance from provisioner 205. For example, in some cases after provisioning automation device 210 in a wireless mesh network of provisioner 205, automation device 210 may control access to the operations/functions of automation device 210 whether or not provisioner 205 remains detectable by or within range of automation device 210, first device 215, and/or second device 220. Also, the present techniques enable automation device 210 to block a device regardless of whether that device supports the Parent Control Model. Also, the present techniques enable automation device 210 to block/unblock/permit second device 220 based on a timer, based on an expiration, based on a request from first device 215, etc. For example, first device 215 may permit second device 220 to control an aspect of automation device 210 and configure a timer based on this permission. First device 215 may then cancel the permission granted to second device 220 and block second device 220 upon determining the timer lapses.

In some cases, wireless communications system 200 may implement one or more message formats in the Parent Control Model. For example, the Parent Control Model of wireless communications system 200 may include at least one of a priority list update message (e.g., PCM_PRI_UPDATE), a priority list update status message (e.g., PCM_PRI_UPDATE_STATUS), a block list update message (e.g., PCM_BL_UPDATE), a block list update status message (e.g., PCM_BL_UPDATE_STATUS), a get list status message (PCM_LIST_GET), a get status of all lists message (PCM_LIST_GET_STATUS), or any combination thereof. In one example, a user device (e.g., first device 215) may send the priority list update message to add/remove devices in the priority list. In one example, the device must be in the priority list to add/remove a device from the priority list. In some cases, the priority list update message may include a duration field. When the duration field is set to zero, the add or remove action may remain permanently until another message reverses it (e.g., reversing an add command with a remove command). In some examples, provisioner 205 may send a priority list update status message in reply to a priority list update message to indicate successful or unsuccessful execution of the add/remove command. In some cases, a user device (e.g., first device 215) may send a block list update message to provisioner 205. The block list update message may include a command to add or remove a device from a block list. In some cases, the block list update message may include a duration to indicate how long the command should stay in effect. When the duration field is zero, the action may remain permanently until another command reverses the action. In some examples, provisioner 205 may send block list update status message in response to block list update message, where the block list update status message indicates whether the add/remove command of block list update message is successfully executed. In some examples, first device 215 may send a get list status message to provisioner 205, where the get list status message requests a status of all lists associated with provisioner 205 (e.g., priority list and/or block list). In some cases, provisioner 205 may send an all lists status message in response to the get list status message. In some cases, the all lists status message may be segmented into two or more messages (e.g., a first message for the priority list and a second message for the block list, etc.).

Figure 3:
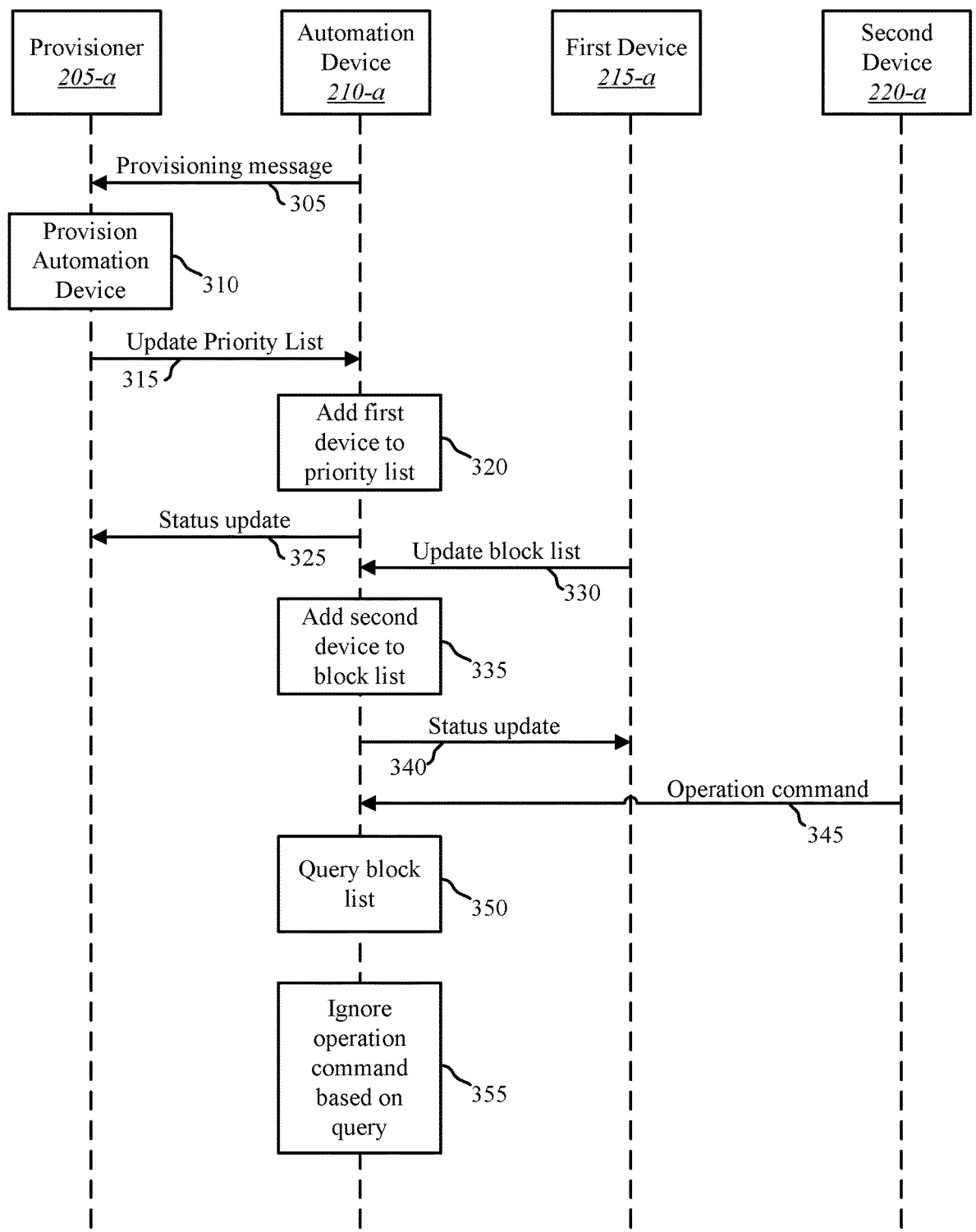
FIG. 3 illustrates an example of a data flow diagram that supports parental control for wireless mesh devices in accordance with aspects of the present disclosure.

FIG. 3 illustrates an example of a data flow diagram 300 that supports parental control for wireless mesh devices in accordance with aspects of the present disclosure. In some examples, data flow diagram 300 may implement aspects of wireless communications system 100. Additionally or alternatively, data flow diagram 300 may implement aspects of wireless communications system 200.

At 305, automation device 210-a may send a provisioning message to provisioner 205-a. In one example, automation device 210-a may send the provisioning message to initiate a provisioning process. In some cases, automation device 210-a may send the provisioning message in response to a message to automation device 210-a from one or more other devices, such as provisioner 205-a (e.g., a message from provisioner 205-a to initiate the provisioning process).

At block 310, provisioner 205-a may perform one or more operations to provision automation device 210-a. Provisioner 205-a provisioning automation device 210-a may include adding automation device 210-a to a wireless mesh network of provisioner 205-a, which may include adding a device identifier (e.g., source address) of automation device 210-a to a list of provisioned devices. In some cases, two or more messages may be communicated between provisioner 205-a and automation device 210-a during the provisioning process. In some cases, the provisioning process may include automation device 210-a provisioning automation device 210-a into a wireless mesh network of provisioner 205-a.

In some examples, provisioner 205-a may receive from automation device 210-a information regarding a configuration of automation device 210-a. In some cases, automation device 210-a may send this information in a first message (e.g., an initial message) to provisioner 205-a, in response to a query from provisioner 205-a, and/or as part of the provisioning process. In some cases, provisioner 205-a may perform device composition and/or other operations to determine that automation device 210-a supports a parental control model configured to control access to operations of automation device 210-a. Operations of automation device 210-a may include performing a task such as an automation task (e.g., turning a light switch on/off, turning an appliance on/off, turning a machine on/off, adjusting a setting of a machine or appliance, adjusting a thermostat, unlocking/locking an automated door lock, activating/deactivating a security camera, setting an alarm to arm/disarm).

At 315, provisioner 205-a may send an update priority list message to automation device 210-a. In some cases, the update priority list message may include a request or command to update a priority list of automation device 210-a. In one example, the update priority list message may specify a device identifier, include an add command, and/or specify the priority list of automation device 210-a. In some cases, the device identifier may be unique to a device in a wireless mesh network of provisioner 205-a. In some cases, the device identifier may be globally unique to a particular device. In some cases, the priority list may be a list of devices permitted to control one or more operations of automation device 210-a. In some cases, the priority list may include one or more entries, where each entry stores a device identifier of a device allowed to control one or more operations of automation device 210-a. In one example, the update priority list message may specify one or more devices to add to the priority list of automation device 210-a. In some cases, the device identifier specified in the update priority list message may include a unicast address or source address of a device. In some cases, provisioner 205-a may determine that first device 215-a is a high priority device and send the update priority list message upon determining that first device 215-a is a high priority device.

In one example, a device identifier (e.g., unicast address, source address) of provisioner 205-a may be added to the priority list of automation device 210-a. In some cases, automation device 210-a may add an identifier of provisioner 205-a to a priority list of automation device 210-a in conjunction with provisioner 205-a provisioning automation device 210-a. In some cases, having the device identifier of provisioner 205-a in the priority list of automation device 210-a enables provisioner 205-a to communicate and/or control one or more aspects of automation device 210-a. Additionally or alternatively, having the device identifier of provisioner 205-a in the priority list of automation device 210-a may enable provisioner 205-a to configure automation device 210-a and/or control one or more aspects of automation device 210-a. In some cases, one device, such as provisioner 205-a, may remove the device identifier of provisioner 205-a from the priority list of automation device 210-a. In some examples, one device, such as provisioner 205-a, may remove the device identifier of provisioner 205-a from the priority list of automation device 210-a while automation device 210-a remains provisioned in the wireless mesh network of provisioner 205-a.

At block 320, automation device 210-a may add an identifier of first device 215-a to the priority list of automation device 210-a. In some cases, automation device 210-a may add the identifier of first device 215-a (e.g., unicast address) to the priority list of automation device 210-a based on the update priority list message from provisioner 205-a.

At 325, automation device 210-a may send a status update message to provisioner 205-a. In some cases, the status update message may indicate a status of adding a device identifier to the priority list of automation device 210-a. For example, status update message may indicate that the device identifier of first device 215-a is added to the priority list of automation device 210-a. In some cases, status update message may indicate that a device identifier of a device is not added to the priority list of automation device 210-a. In some cases, status update message may indicate a reason why a device is not added to the priority list (e.g., no available entries, not enough memory for a device identifier to be added).

At 330, first device 215-a may send an update block list message to automation device 210-a. In some examples, updating the priority list and/or updating the block list may be optional. For example, an update may include updating only priority list or updating only the block list. Alternatively, an update may include updating both the priority list and the block list in the same update operation. In some cases, automation device 210-a may include both a priority list and a block list. In some cases, the update block list message may include a request or command to update a block list of automation device 210-a. In one example, the update block list message may specify a device identifier and include an add command. In some cases, the block list is a list of devices prohibited from controlling an operation of automation device 210-*a*. In some cases, the priority list may include one or more entries, where each entry stores a device identifier of a device blocked from controlling an operation of automation device 210-*a*. In one example, the update block list message may specify one or more devices to add to the block list of automation device 210-*a*. In some cases, the device identifier specified in the update block list message may include a unicast address or source address of a device. In one example, update block list message may include a command to add a device identifier of second device 220-*a* to the block list of automation device 210-*a*. For example, update block list message may specify a device identifier (e.g., device identifier of second device 220-*a*), include an add command, and/or specify the block list of automation device 210-*a*.

At 335, automation device 210-*a* may add the device identifier of second device 220-*a* to the block list of automation device 210-*a*. In some cases, automation device 210-*a* may query its priority list upon receiving the update block list message from first device 215-*a* at 330, to determine whether first device 215-*a* is listed in the priority list. Upon determining first device 215-*a* is listed in the priority list, automation device 210-*a* may execute the add command and add the device identifier of second device 220-*a* to the block list. In some cases, provisioner 205-*a* may send an update priority list to automation device 210-*a* requesting that the device identifier of first device 215-*a* be removed from the priority list. Upon receiving the update block list message from first device 215-*a* at 330 and determining first device 215-*a* is not listed or no longer listed in the priority list, automation device 210-*a* may ignore the update block list message from first device 215-*a*, resulting in the device identifier of second device 220-*a* not being added to the block list.

At 340, automation device 210-*a* may send a status update message to first device 215-*a*. In one example, the status update message may indicate that the device identifier of second device 220-*a* is successfully added to the block list. In some cases, the status update message may indicate that the device identifier of second device 220-*a* is not added to the block list (e.g., no available entries or not enough memory for a device identifier to be added, etc.).

At 345, second device 220-*a* may send an operation command message to automation device 210-*a*. In some cases, the operation command message may include a command for the automation device 210-*a* to perform an operation the automation device 210-*a* is configured to perform. For example, automation device 210-*a* may include an automated light switch, and the operation command message may include a command to turn the automated light switch on, among other examples.

At block 350, automation device 210-*a* may query its block list. In some cases, automation device 210-*a* may query its block list upon receiving an operation command message. Accordingly, upon receiving the operation command message from second device 220-*a*, automation device 210-*a* may query its block list to determine whether second device 220-*a* is listed in its block list. At block 355, automation device 210-*a* may ignore the operation command message upon determining second device 220-*a* is listed in its block list.

In some cases, provisioner 205-*a* or first device 215-*a*, among other devices, may send an update block list to automation device 210-*a* requesting that the device identifier of second device 220-*a* be removed from the block list. In some cases, upon receiving the update block list from provisioner 205-*a* or first device 215-*a*, automation device 210-*a* may determine whether provisioner 205-*a* or first device 215-*a* are allowed to request an update to block list.

For example, upon receiving the update block list from provisioner 205-*a* (or first device 215-*a*), automation device 210-*a* may query its priority list to determine whether provisioner 205-*a* (or first device 215-*a*) is listed in the priority list, and upon determining provisioner 205-*a* (or first device 215-*a*) is listed in its priority list, automation device 210-*a* may update the block list. Accordingly, upon receiving the operation command message from second device 220-*a* at 345 and determining second device 220-*a* is not listed or no longer listed in the block list, automation device 210-*a* may perform the operation requested in the operation command message from second device 220-*a*.

Figure 4:
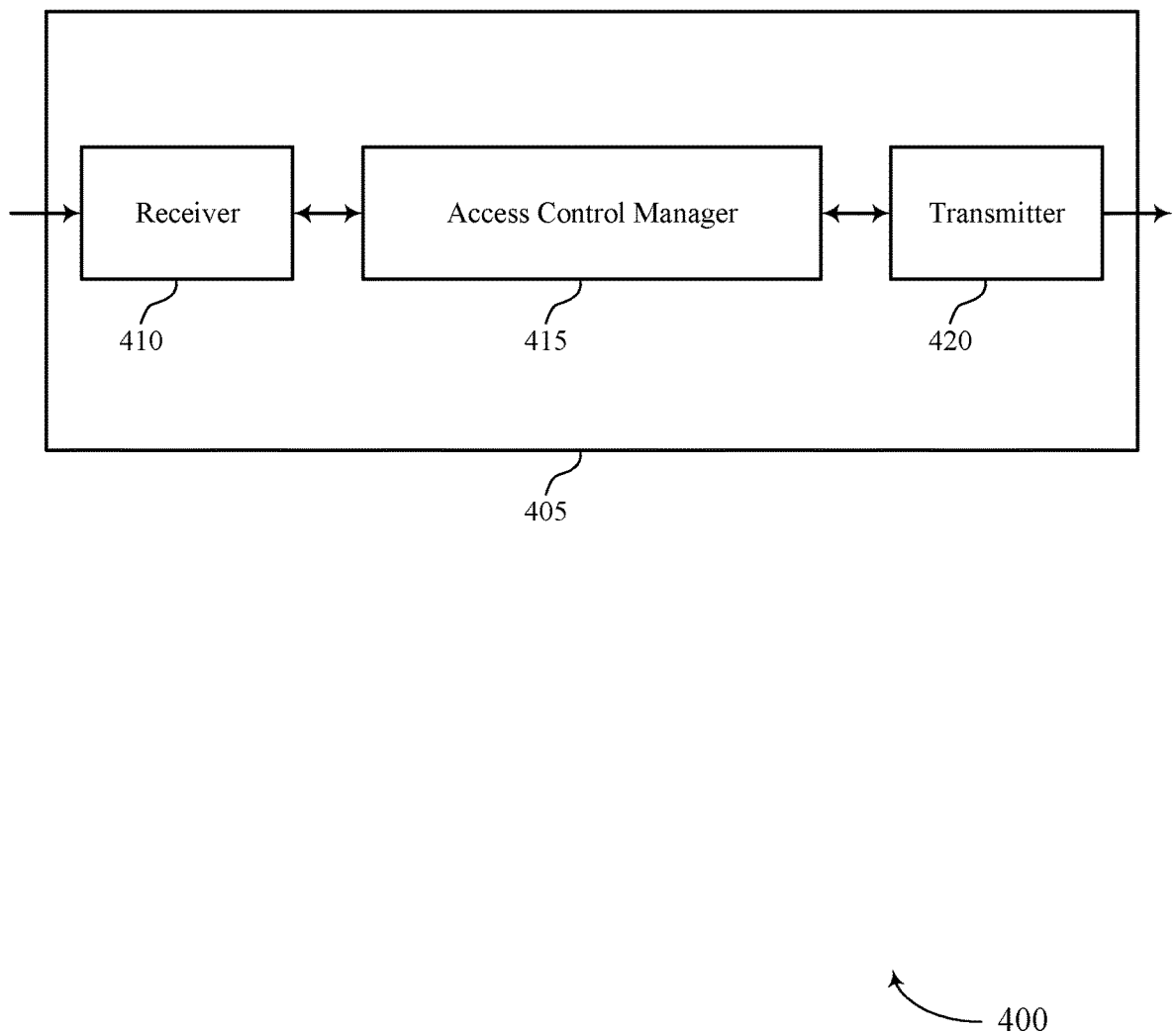
FIGS. 4 and 5 show block diagrams of devices that support parental control for wireless mesh devices in accordance with aspects of the present disclosure.

FIG. 4 shows a block diagram 400 of a device 405 that supports parental control for wireless mesh devices in accordance with aspects of the present disclosure. The device 405 may be an example of aspects of an AP 105, device 110, paired device 115, provisioner 205, automation device 210, first device 215, and/or second device 220 as described herein. The device 405 may include a receiver 410, an access control manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to parental control for wireless mesh devices, etc.). Information may be passed on to other components of the device 405. The receiver 410 may be an example of aspects of the transceiver 720 described with reference to FIG. 7. The receiver 410 may utilize a single antenna or a set of antennas.

The access control manager 415 may receive, by an automation device, a first message from a control device, the first message including an identifier of a first user device and an add command, add, by the automation device, the identifier of the first user device to a priority list of the automation device based on receiving the first message, and control, by the automation device, access to operations of the automation device based on the identifier in the priority list after adding the identifier of the first user device. The access control manager 415 may be an example of aspects of the access control manager 710 described herein. In some cases, operations of the automation device may be preprogrammed in the automation device. For example, the automation device may be configured to perform one or more operations or functions such as turning a device or appliance on/off, adjusting a setting of a device or appliance, etc.

The access control manager 415, or its sub-components, may be implemented in hardware, code (e.g., software or firmware) executed by a processor, or any combination thereof. If implemented in code executed by a processor, the functions of the access control manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The access control manager 415, or its sub-components, may be physically located at various positions, including being distributed such that portions of functions are implemented at different physical locations by one or more physical components. In some examples, the access control manager 415, or its sub-components, may be a separate and distinct component in accordance with various aspects of the present disclosure. In some examples, the access control manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
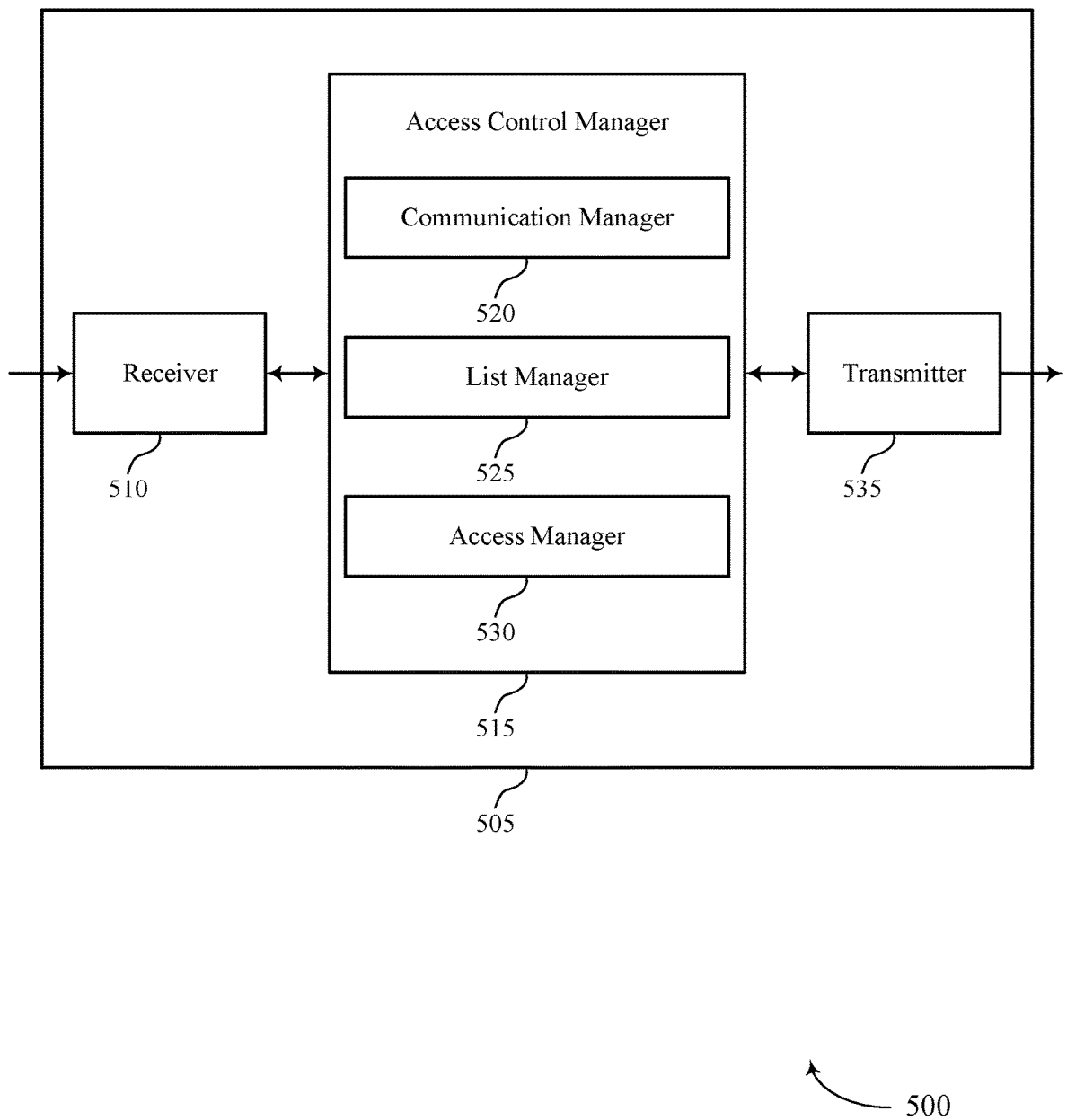

FIG. 5 shows a block diagram 500 of a device 505 that supports parental control for wireless mesh devices in accordance with aspects of the present disclosure. The device 505 may be an example of aspects of AP 105, device 110, paired device 115, provisioner 205, automation device 210, first device 215, second device 220, or device 405 as described herein. The device 505 may include a receiver 510, an access control manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to parental control for wireless mesh devices, etc.). Information may be passed on to other components of the device 505. The receiver 510 may be an example of aspects of the transceiver 720 described with reference to FIG. 7. The receiver 510 may utilize a single antenna or a set of antennas.

The access control manager 515 may be an example of aspects of the access control manager 415 as described herein. The access control manager 515 may include a communication manager 520, a list manager 525, and an access manager 530. The access control manager 515 may be an example of aspects of the access control manager 710 described herein.

The communication manager 520 may receive, by an automation device, a first message from a control device, the first message including an identifier of a first user device and an add command. The list manager 525 may add, by the automation device, the identifier of the first user device to a priority list of the automation device based on receiving the first message. The access manager 530 may control, by the automation device, access to operations of the automation device based on the identifier in the priority list after adding the identifier of the first user device.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
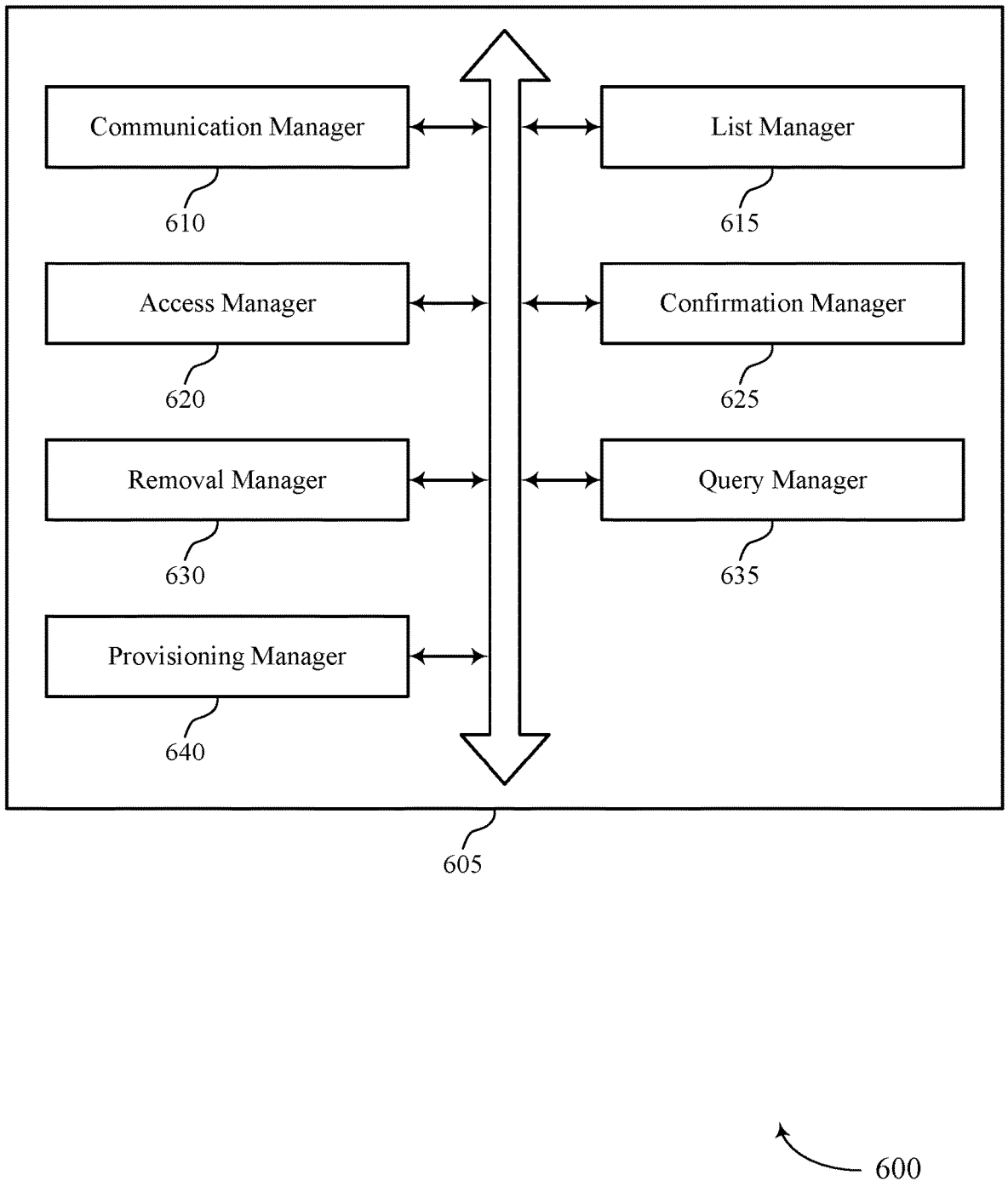
FIG. 6 shows a block diagram of an access control manager that supports parental control for wireless mesh devices in accordance with aspects of the present disclosure.

FIG. 6 shows a block diagram 600 of an access control manager 605 that supports parental control for wireless mesh devices in accordance with aspects of the present disclosure. The access control manager 605 may be an example of aspects of an access control manager 415, an access control manager 515, or an access control manager 710 described herein. The access control manager 605 may include a communication manager 610, a list manager 615, an access manager 620, a confirmation manager 625, a removal manager 630, a query manager 635, and a provisioning manager 640. Each of these modules may communicate, directly or indirectly, with one another (e.g., via one or more buses).

The communication manager 610 may receive, by an automation device, a first message from a control device, the first message including an identifier of a first user device and an add command. In some examples, the communication manager 610 may receive, from the first user device, a second message including an identifier of a second user device and a block command to add the identifier of the second user device to a block list of the automation device, where controlling access to operations of the automation device is based on receiving the second message.

In some examples, the communication manager 610 may send, to the first user device, a third message indicating whether the identifier of the second user device has been added to the block list, where controlling access to operations of the automation device is based on sending the third message. In some examples, the communication manager 610 may receive, from the second user device, a fourth message including a command for the automation device to perform an operation.

In some examples, the communication manager 610 may receive, from the first user device, a fifth message including a removal command to remove the identifier of the second user device from the block list, where controlling access to operations of the automation device is based on the removal command. The list manager 615 may add, by the automation device, the identifier of the first user device to a priority list of the automation device based on receiving the first message.

In some examples, the list manager 615 may add an identifier of the control device to a priority list of the automation device based on receiving the indication. In some examples, the list manager 615 may ignore a request to remove the identifier of the control device from the priority list while the automation device is provisioned in the wireless mesh network of the control device.

The access manager 620 may control, by the automation device, access to operations of the automation device based on the identifier in the priority list after adding the identifier of the first user device. In some examples, the access manager 620 may ignore the command of the fourth message based on a result of the querying.

The confirmation manager 625 may send, to the control device, a reply message indicating whether the first user device has been added to the priority list, where controlling access to operations of the automation device is based on sending the reply message. In some examples, the confirmation manager 625 may receive, from the control device, an indication confirming that the automation device is provisioned in the wireless mesh network.

The removal manager 630 may remove the identifier of the second user device from the block list upon determining a time period lapses, where the second message indicates the time period. The query manager 635 may query the block list based on receiving the fourth message. The provisioning manager 640 may send, to the control device before receiving the first message, a request to provision the automation device in a wireless mesh network of the control device.

Figure 7:
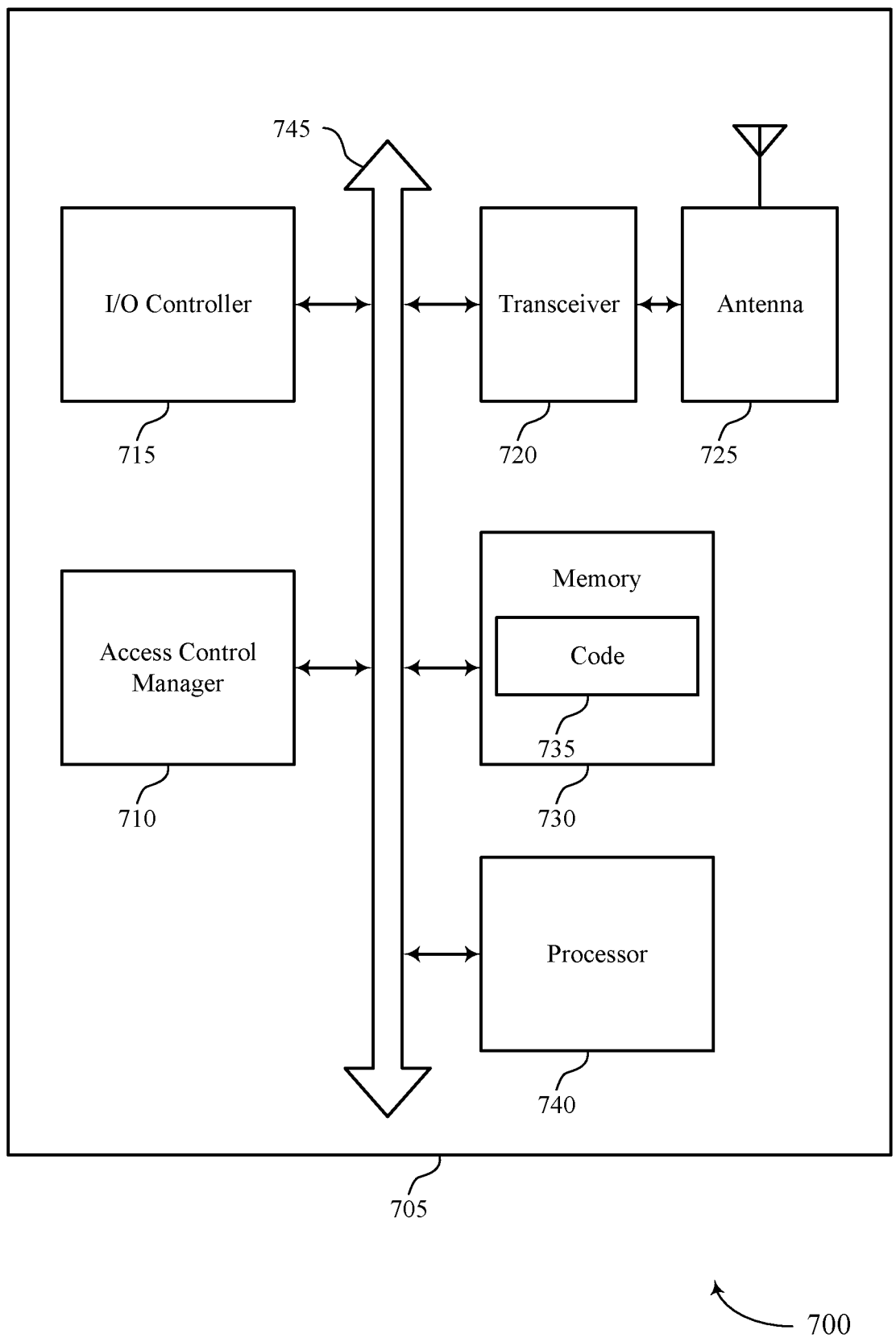
FIG. 7 shows a diagram of a system including a device that supports parental control for wireless mesh devices in accordance with aspects of the present disclosure.

FIG. 7 shows a diagram of a system 700 including a device 705 that supports parental control for wireless mesh devices in accordance with aspects of the present disclosure. The device 705 may be an example of or include the components of device 405, device 505, or a device as described herein. The device 705 may include components for bi-directional voice and data communications including components for transmitting and receiving communications, including an access control manager 710, an I/O controller 715, a transceiver 720, an antenna 725, memory 730, and a processor 740. These components may be in electronic communication via one or more buses (e.g., bus 745).

The access control manager 710 may receive, by an automation device, a first message from a control device, the first message including an identifier of a first user device and an add command, add, by the automation device, the identifier of the first user device to a priority list of the automation device based on receiving the first message, and control, by the automation device, access to operations of the automation device based on the identifier in the priority list after adding the identifier of the first user device.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting parental control for wireless mesh devices).

The code 735 may include instructions to implement aspects of the present disclosure, including instructions to support controlling mesh network devices. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
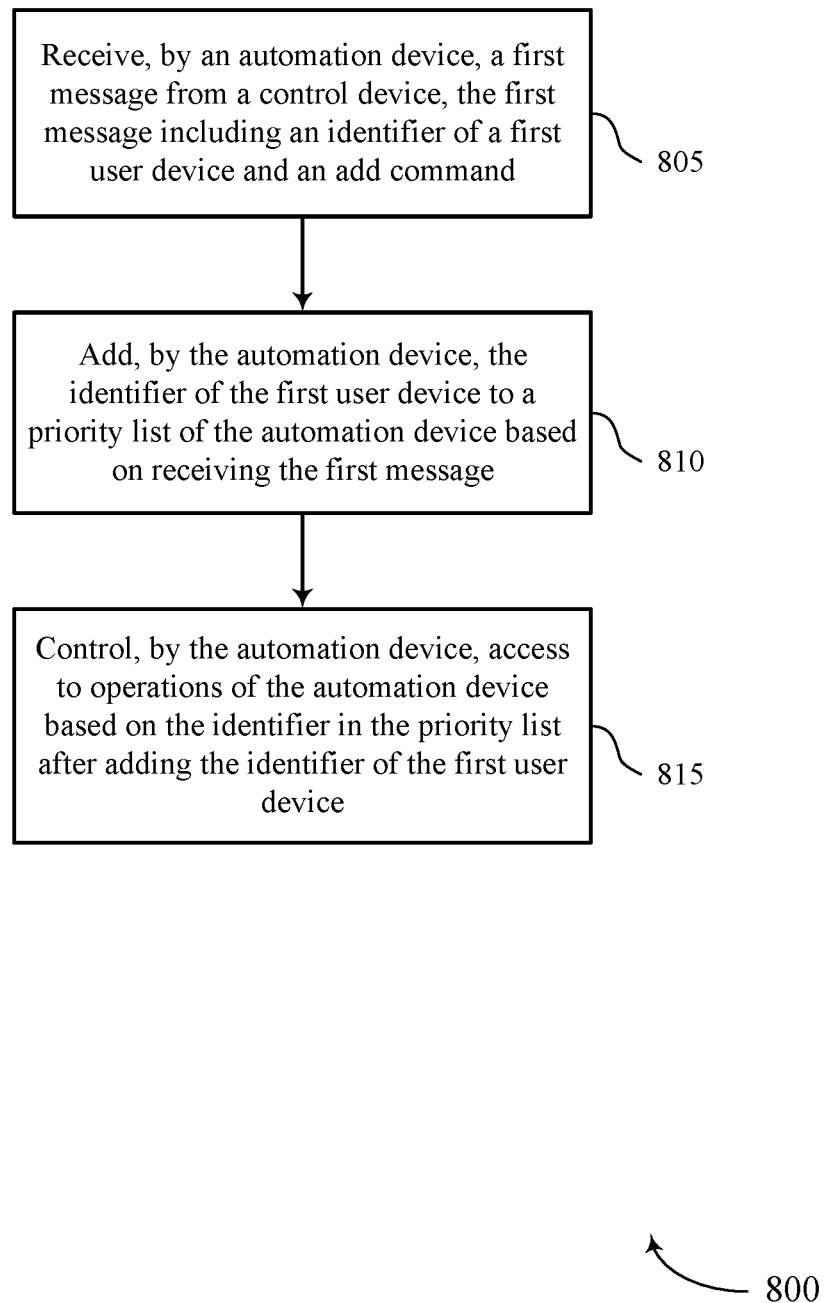
FIGS. 8 and 9 show flowcharts illustrating methods that support parental control for wireless mesh devices in accordance with aspects of the present disclosure.

FIG. 8 shows a flowchart illustrating a method 800 that supports parental control for wireless mesh devices in accordance with aspects of the present disclosure. The operations of method 800 may be implemented by a device or its components as described herein. For example, the operations of method 800 may be performed by an access control manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 805, the device may receive, by an automation device, a first message from a control device, the first message including an identifier of a first user device and an add command. The operations of 805 may be performed according to the methods described herein. In some examples, aspects of the operations of 805 may be performed by a communication manager as described with reference to FIGS. 4 through 7.

At 810, the device may add, by the automation device, the identifier of the first user device to a priority list of the automation device based on receiving the first message. The operations of 810 may be performed according to the methods described herein. In some examples, aspects of the operations of 810 may be performed by a list manager as described with reference to FIGS. 4 through 7.

At 815, the device may control, by the automation device, access to operations of the automation device based on the identifier in the priority list after adding the identifier of the first user device. The operations of 815 may be performed according to the methods described herein. In some examples, aspects of the operations of 815 may be performed by an access manager as described with reference to FIGS. 4 through 7.

Figure 9:
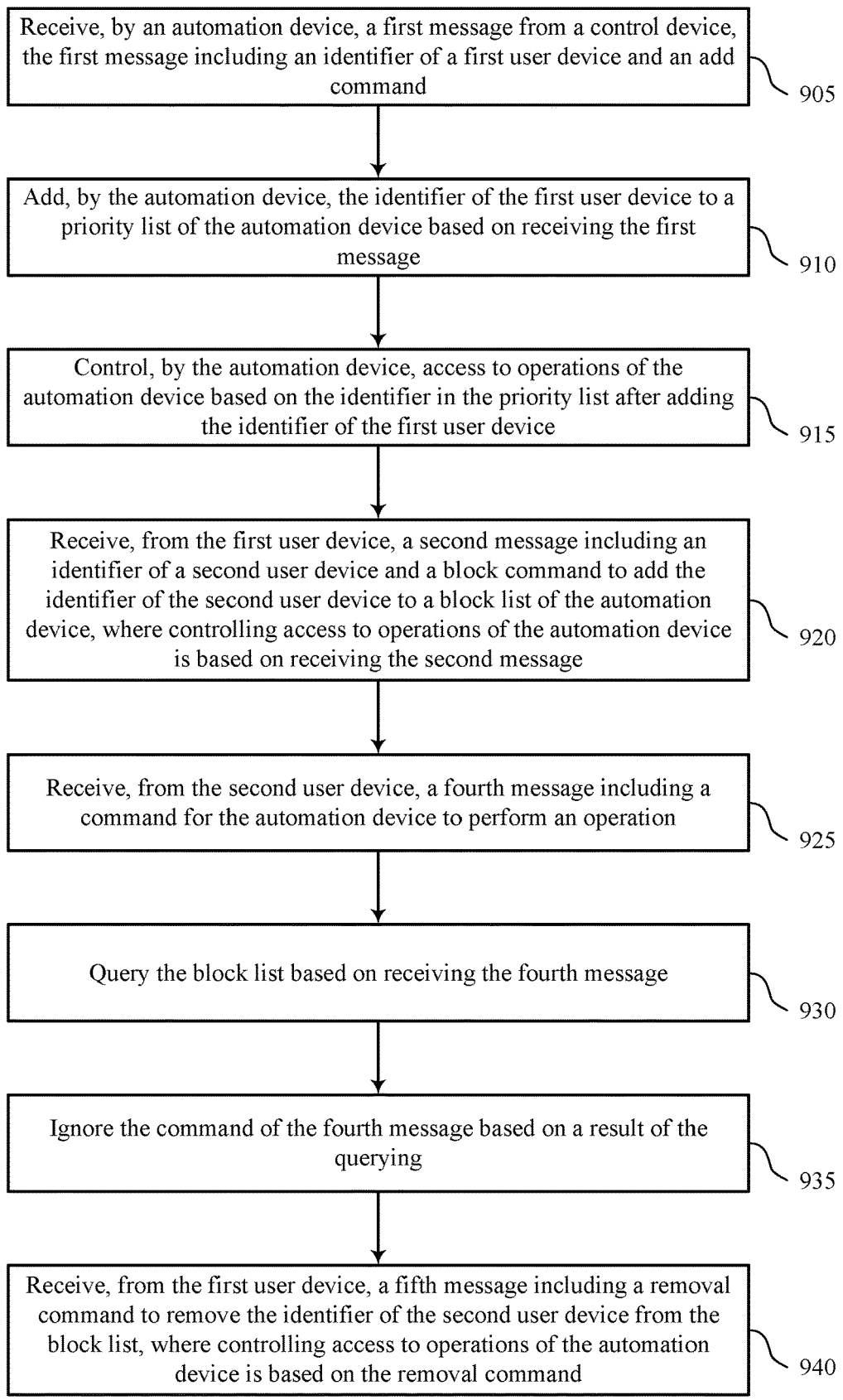

FIG. 9 shows a flowchart illustrating a method 900 that supports parental control for wireless mesh devices in accordance with aspects of the present disclosure. The operations of method 900 may be implemented by a device or its components as described herein. For example, the operations of method 900 may be performed by an access control manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 905, the device may receive, by an automation device, a first message from a control device, the first message including an identifier of a first user device and an add command. The operations of 905 may be performed according to the methods described herein. In some examples, aspects of the operations of 905 may be performed by a communication manager as described with reference to FIGS. 4 through 7.

At 910, the device may add, by the automation device, the identifier of the first user device to a priority list of the automation device based on receiving the first message. The operations of 910 may be performed according to the methods described herein. In some examples, aspects of the operations of 910 may be performed by a list manager as described with reference to FIGS. 4 through 7.

At 915, the device may control, by the automation device, access to operations of the automation device based on the identifier in the priority list after adding the identifier of the first user device. The operations of 915 may be performed according to the methods described herein. In some examples, aspects of the operations of 915 may be performed by an access manager as described with reference to FIGS. 4 through 7.

At 920, the device may receive, from the first user device, a second message including an identifier of a second user device and a block command to add the identifier of the second user device to a block list of the automation device, where controlling access to operations of the automation device is based on receiving the second message. The operations of 920 may be performed according to the methods described herein. In some examples, aspects of the operations of 920 may be performed by a communication manager as described with reference to FIGS. 4 through 7.

At 925, the device may receive, from the second user device, a fourth message including a command for the automation device to perform an operation. The operations of 925 may be performed according to the methods described herein. In some examples, aspects of the operations of 925 may be performed by a communication manager as described with reference to FIGS. 4 through 7.

At 930, the device may query the block list based on receiving the fourth message. The operations of 930 may be performed according to the methods described herein. In some examples, aspects of the operations of 930 may be performed by a query manager as described with reference to FIGS. 4 through 7.

At 935, the device may ignore the command of the fourth message based on a result of the querying. The operations of 935 may be performed according to the methods described herein. In some examples, aspects of the operations of 935 may be performed by an access manager as described with reference to FIGS. 4 through 7.

At 940, the device may receive, from the first user device, a fifth message including a removal command to remove the identifier of the second user device from the block list, where controlling access to operations of the automation device is based on the removal command. The operations of 940 may be performed according to the methods described herein. In some examples, aspects of the operations of 940 may be performed by a communication manager as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

The wireless communications system 100 or systems described herein may support synchronous or asynchronous operation. For synchronous operation, the APs 105 may have similar frame timing, and transmissions from different APs 105 may be approximately aligned in time. For asynchronous operation, the APs 105 may have different frame timing, and transmissions from different APs 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for controlling mesh network devices, comprising:
   receiving, by an automation device, a first message from a control device, the first message including an identifier of a first user device and an add command;
   adding, by the automation device, the identifier of the first user device to a priority list of the automation device based at least in part on receiving the first message;
   receiving, from the first user device, a second message including an identifier of a second user device and a block command to add the identifier of the second user device to a block list of the automation device, wherein controlling access to operations of the automation device is based at least in part on receiving the second message;
   sending, to the first user device, a third message indicating whether the identifier of the second user device has been added to the block list, wherein controlling access to operations of the automation device is based at least in part on sending the third message; and
   controlling, by the automation device, access to operations of the automation device based at least in part on the identifier in the priority list after adding the identifier of the first user device.

2. The method of claim 1, further comprising:
   sending, to the control device, a reply message indicating whether the first user device has been added to the priority list, wherein controlling access to operations of the automation device is based at least in part on sending the reply message.

3. The method of claim 1, further comprising:
   removing the identifier of the second user device from the block list upon determining a time period lapses, wherein the second message indicates the time period.

4. The method of claim 1, further comprising:
   receiving, from the second user device, a fourth message including a command for the automation device to perform an operation;
   querying the block list based at least in part on receiving the fourth message; and
   ignoring the command of the fourth message based at least in part on a result of the querying.

5. The method of claim 1, further comprising:
   receiving, from the first user device, a fifth message including a removal command to remove the identifier of the second user device from the block list, wherein controlling access to operations of the automation device is based at least in part on the removal command.

6. The method of claim 1, further comprising:
   sending, to the control device before receiving the first message, a request to provision the automation device in a wireless mesh network of the control device; and
   receiving, from the control device, an indication confirming that the automation device is provisioned in the wireless mesh network.

7. The method of claim 6, further comprising:
   adding an identifier of the control device to a priority list of the automation device based at least in part on receiving the indication.

8. The method of claim 7, further comprising:
   ignoring a request to remove the identifier of the control device from the priority list while the automation device is provisioned in the wireless mesh network of the control device.

9. An apparatus for controlling mesh network devices, comprising:
   a processor,
   memory in electronic communication with the processor; and
   instructions stored in the memory and executable by the processor to cause the apparatus to:
      receive a first message from a control device, the first message including an identifier of a first user device and an add command;
      add the identifier of the first user device to a priority list of the apparatus based at least in part on receiving the first message;
      receive, from the first user device, a second message including an identifier of a second user device and a block command to add the identifier of the second user device to a block list of the apparatus, wherein controlling access to operations of the apparatus is based at least in part on receiving the second message;

send, to the first user device, a third message indicating whether the identifier of the second user device has been added to the block list, wherein controlling access to operations of the apparatus is based at least in part on sending the third message; and control access to operations of the apparatus based at least in part on the identifier in the priority list after adding the identifier of the first user device.

10. The apparatus of claim 9, wherein the instructions are further executable by the processor to cause the apparatus to:

send, to the control device, a reply message indicating whether the first user device has been added to the priority list, wherein controlling access to operations of the apparatus is based at least in part on sending the reply message.

11. The apparatus of claim 9, wherein the instructions are further executable by the processor to cause the apparatus to:

remove the identifier of the second user device from the block list upon determining a time period lapses, wherein the second message indicates the time period.

12. The apparatus of claim 9, wherein the instructions are further executable by the processor to cause the apparatus to:

receive, from the second user device, a fourth message including a command for the apparatus to perform an operation;

query the block list based at least in part on receiving the fourth message; and ignore the command of the fourth message based at least in part on a result of the querying.

13. The apparatus of claim 9, wherein the instructions are further executable by the processor to cause the apparatus to:

receive, from the first user device, a fifth message including a removal command to remove the identifier of the second user device from the block list, wherein controlling access to operations of the apparatus is based at least in part on the removal command.

14. The apparatus of claim 9, wherein the instructions are further executable by the processor to cause the apparatus to:

send, to the control device before receiving the first message, a request to provision the apparatus in a wireless mesh network of the control device; and receive, from the control device, an indication confirming that the apparatus is provisioned in the wireless mesh network.

15. A non-transitory computer-readable medium of an automation device storing code for controlling mesh network devices, the code comprising instructions executable by a processor to:

receive a first message from a control device, the first message including an identifier of a first user device and an add command;

add the identifier of the first user device to a priority list of the automation device based at least in part on receiving the first message;

receive, from the first user device, a second message including an identifier of a second user device and a block command to add the identifier of the second user device to a block list of the apparatus, wherein controlling access to operations of the apparatus is based at least in part on receiving the second message;

send, to the first user device, a third message indicating whether the identifier of the second user device has been added to the block list, wherein controlling access to operations of the apparatus is based at least in part on sending the third message; and control access to operations of the automation device based at least in part on the identifier in the priority list after adding the identifier of the first user device.

16. The non-transitory computer-readable medium of claim 15, wherein the instructions are further executable to:

send, to the control device, a reply message indicating whether the first user device has been added to the priority list, wherein controlling access to operations of the automation device is based at least in part on sending the reply message.

* * * * *